July 26, 1960  J. W. DICKEY  2,946,374
SEAT CONSTRUCTION AND THE LIKE
Filed Sept. 30, 1957  2 Sheets-Sheet 2
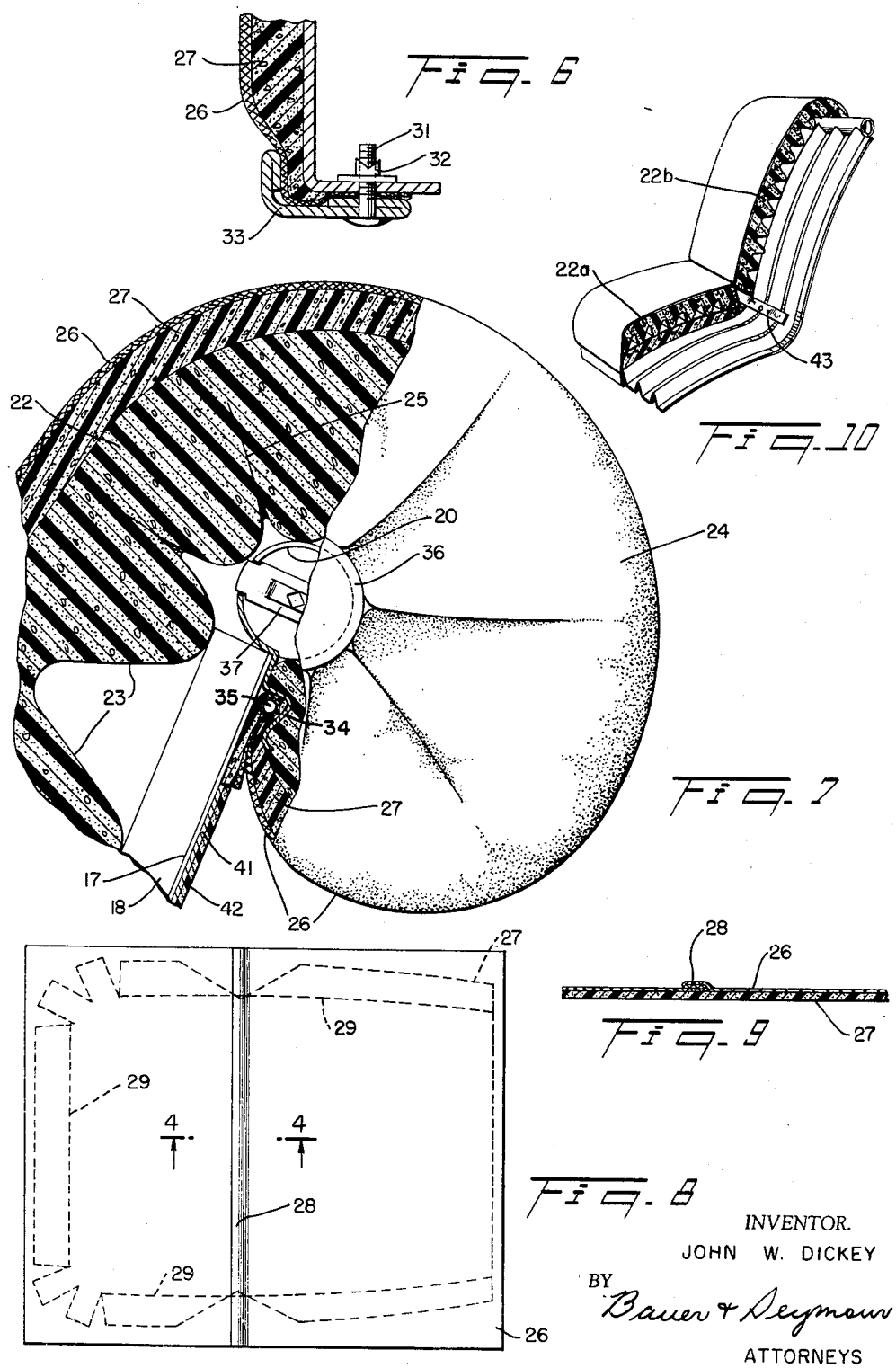
INVENTOR.
JOHN W. DICKEY
BY
Bauer & Seymour
ATTORNEYS United States Patent Office 2,946,374
Patented July 26, 1960

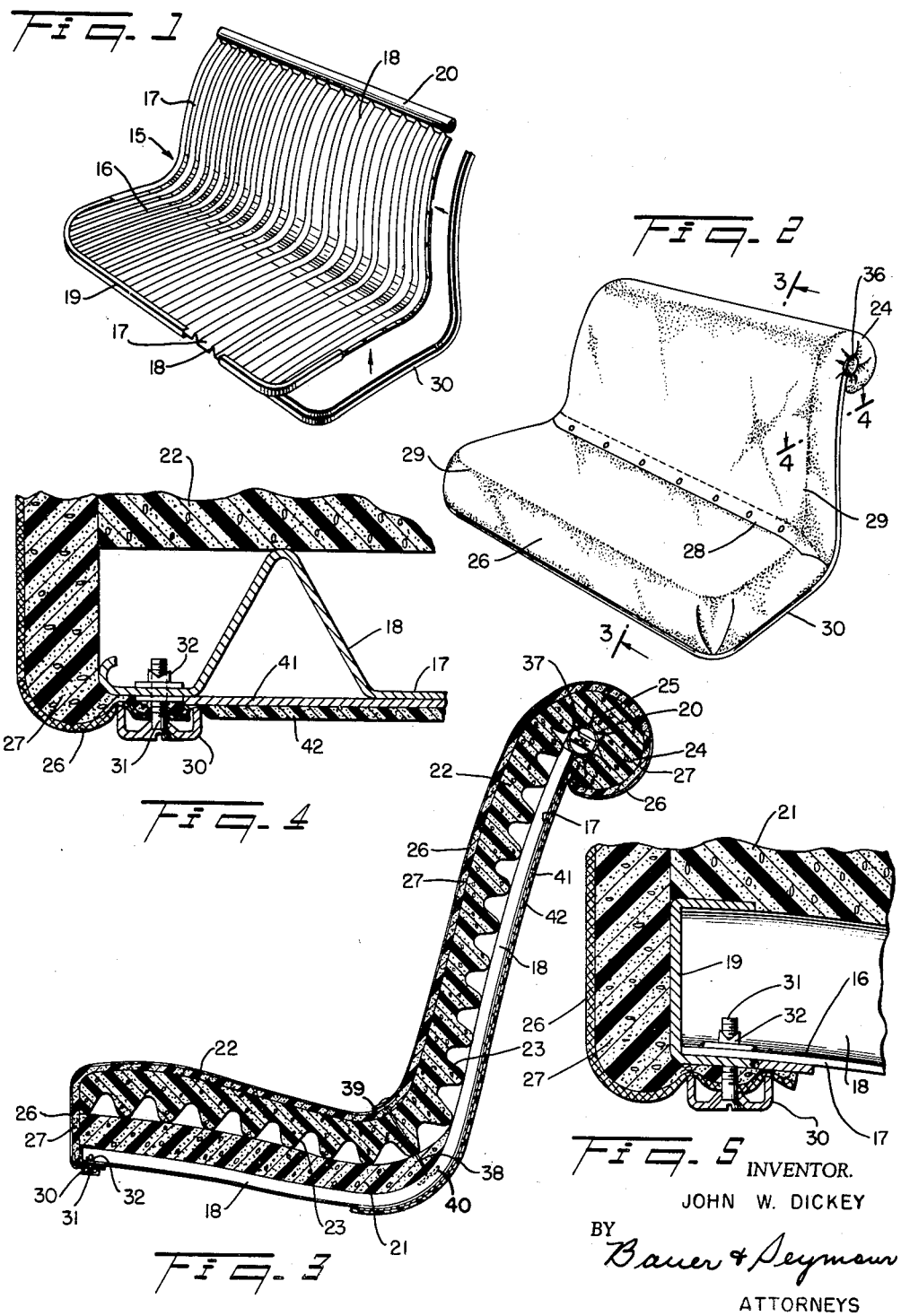

2,946,374
SEAT CONSTRUCTION AND THE LIKE

John W. Dickey, Ridgewood, N.J., assignor to Curtiss-Wright Corporation, a corporation of Delaware Filed Sept. 30, 1957, Ser. No. 687,223

4 Claims. (Cl. 155—179)

This invention relates to seating equipment and the like and particularly seats adapted for vehicles, such as automobiles, aircraft and railway cars.

One of the objects of the present invention is to provide a novel seat construction which may be embodied in seating equipment and furniture for a wide variety of uses, including uses in vehicles and the home.

Another object of the invention is to provide a novelly constructed seat which is considerably less complicated and much easier to assemble than prior known structures of comparable quality and dependability.

Still another object is to provide a soft and durable seat, without the use of springs, which has all of the advantages of comparable known overstuffed seats and the further advantages of being lighter and requiring less space.

A further object is to provide a novel seat which is constructed from a very small number of novelty combined major parts that may be rapidly and inexpensively manufactured and assembled by unskilled workers.

A still further object is to provide a seat construction which is particularly adapted for automobiles, aircraft and the like because of the novel use therein of light weight materials which consume less space than materials heretofore used for comparable constructions.

Still another object is to provide a novel and simplified combination of seat and crash pad construction especially adapted for use in vehicles and aircraft.

Another object is to provide novel means for upholstering seating equipment which obviates the necessity of any sewing and greatly reduces the time required for application thereof to the cushioning means.

Another object is to provide a seat which is a novelly constructed with a minimum thickness and weight of durable resilient materials without sacrifice of comfort and useful life.

The above and further objects and novel features of the present invention will more fully appear from the following detailed description when the same is read in connection with the accompanying drawings. It is to be understood, however, that the drawings are for the purpose of illustration only and are not intended as a definition of the limits of the invention.

In the drawings, wherein like reference characters refer to like parts throughout the several views, Fig. 1 is an isometric view of one form of partially assembled seat body which may be used in carrying out the present invention;

Fig. 2 is an isometric view of an assembled seat designed for use in automobiles and the like;

Fig. 3 is a sectional view on an enlarged scale, the section being taken substantially on line 3—3 of Fig. 2;

Fig. 4 is a detail sectional view on an enlarged scale, the section being taken substantially on line 4—4 of Fig. 2;

Fig. 5 is an enlarged sectional view of the front edge of the seat as shown in Fig. 3;

Fig. 6 is a detail sectional view illustrating a modified fastening means for the upholstery;

Fig. 7 is a detail view, partly in section and with parts broken away, showing the headrest and crash pad portion of the seat of Fig. 2;

Fig. 8 is a plan view of a laminated blank used to upholster the seat of Fig. 2;

Fig. 9 is a sectional view of said blank taken substantially on line 4—4 of Fig. 8; and, Fig. 10 is an isometric view, partly in section and with parts broken away, illustrating a modified form of seat construction embodying the invention.

The invention is illustrated in the accompanying drawings, by way of example, in the form of a seat of the type conventionally used in automobiles and other vehicles. In the embodiments shown, there is a rigid seat body 15 having a relatively horizontal seat portion 16 and a backrest 17. The seat portion and backrest may be contoured to suit the wishes of the designer. The rigid structure 15 may be made of light weight metal, reinforced plastic or the like and is provided in any suitable manner, such as by roll-forming, pressing or molding, with a plurality of spaced ribs or ridges 18 that extend fore-and-aft of the seat 16 and up-and-down on the backrest. The front edge and corners of the seat portion 16 may be enclosed by a trim channel 19. A bar or tube 20 or its equivalent extends across the upper edge of backrest 17 and is secured thereto by any suitable means, such as by riveting, spot welding or the like, depending upon the types of materials used.

Cushioning means are provided in novel combination with corrugated seat body 15 and in the form illustrated, in Fig. 3, the same comprises a cushion 21 of foamed material, such as polyurethane or other plastic foams, resting on the ribs 18 of seat portion 16. This cushion of plastic foam and the ribbed structure of the seat cooperate to give desirable load-bearing characteristics to the foamed material, as well as a suitable spring action when the cushion is loaded. The physical characteristics of cushion member 21 are such that it will not sag into contact with the seat 16 between ridges 18 when the maximum intended load is applied. When the cushion is loaded, there will be a tensioning of the resilient material of the cushion between ribs 18 and a sagging thereof in space to create a spring-like effect in addition to the normal resiliency of the cushion.

Superposed on cushion member 21 and extending to cover backrest 17 is a second cushion member 22 which may also be made of foamed material, such as polyurethane or other plastic foams. The lower surface of member 22 which engages member 21 and the corrugated backrest 17 is grooved transversely of the seat and the backrest to provide a series of horizontal ribs or ridges 23. The latter make line or ribbon contact with cushion member 21 and point or spot contact with the ribs 18 of backrest 17. This novel combination of cushions and seat body affords maximum comfort for the occupant in both the seat and backrest portions of the seat construction. These cushions yield easily to light loads and become firmer and less yielding as the load increases.

To provide a headrest and a buffer or crash pad for the protection of anyone who might be accidentally thrown against the back of the seat, cushion member 22 is curled over the bar or tube 20 and secured in position in a manner to be hereinafter described. In thus mounting cushion 22, the ribs 23 in the curled portion thereof are brought into contact with each other to provide a headrest and crash pad 24 which is somewhat firmer than the backrest. If desired, the engaging surfaces of the ribs, such as at 25 in the curled portion of cushion 22, may be adhesively adhered.

The cushion structure 21, 22 is novelly secured in position by means which also function as the upholstering for the seat. In the illustrated embodiment, said means comprises a unitary blank 26 of suitable fabric or plastic (Fig. 8) which may be and preferably is laminated to a preformed blank 27 of foamed plastic or the like. The blank 27 is formed with suitable flaps and notches to permit it to be folded around the upper surfaces and the front and end edges of cushion 21, 22 as a single thickness without the necessity of sewing. The blank 26 of fabric, vinyl film or the like may be rectangular and excess material, such as at the corners, may be consumed in pleats either outside or inside of the flaps at the corners of foam layer 27. In order to provide sufficient material in blank 26 for the fold-down portion at the juncture between seat 16 and backrest 17, a transverse fold or pleat 28 may be provided. The fold line of the laminated blank is illustrated at 29. As illustrated, the lamina 27 is provided with triangular notches beneath the fold 28. In some embodiments, it may be desirable to eliminate these notches, but the corresponding material of blank 27 should not be secured to the outer lamination 26. When materials having a sufficient two-way stretch are used in the construction of topper blank 26, 27, the fold 28 may be dispensed with.

Blank 26, 27 folds neatly about the seat body and cushion construction, and the edges thereof are anchored preferably beneath the seat and at the back of the backrest by any suitable known fastening means. Across the front and ends of the seat body, the edges of the laminated topper 26, 27 are caught beneath a decorative trim channel 30 which may be secured to the seat body 15 by suitable means such as Tinnerman speed nut fasteners 31, 32. If desired, the trim channel 30 may be replaced by a trim strip 33 of the type shown in section in Fig. 6. At its upper edges beneath the crash pad 24, the topper 26, 27 is anchored by means of a clip or clasp 34 which may be integral with or suitably secured to the cross tube 20. The marginal edge of the topper is shown as being folded over a bar 35 and snapped beneath the clip 34 where it is resiliently held by the clip and the compression of the resilient blank 27. The excess of the fold-down portion of the topper at the ends of crash pad 24 is preferably neatly pleated in and held at the center by a decorative button type push-in fastener. One suitable type of fastener is a Tinnerman push type fastener comprising a button 36 with a serrated stem which engages a slotted spring metal catch 37 mounted to extend transversely across tube 20.

The complete cushion, including the topper 26, 27, may be anchored at the base of the backrest by any suitable means, such as a plurality of cords 38 each having a button 39 at one end thereof and a spread-apart fastener 40 at the other end. The cords preferably extend through fold 28 and through the seat body between adjacent ribs 18.

The back and bottom of the seat body may be covered, if desired, for ornamentation, with a laminate comprising a sheet 41 of fiber board or the like and a thin layer 42 of plastic foam or the like which may in turn be coated with flock, fabric or a vinyl film. This cover 41, 42 may be secured in position by the same means whereby the topper 26, 27 is secured. If desired, sheet metal screws and washers may be used to fasten the horizontal edge portions of the covering 41, 42 to the rigid seat body 15.

In some installations it may be found desirable to divide cushion member 22 at the base of the backrest into two pieces 22a and 22b, as illustrated in Fig. 10. The topper 26, 27 can then be pulled back between these two parts of the upper cushion and fastened to the seat body 15 by means of a bar 43. The lamina 27 of the topper blank may also be separated, if desired, and only the lamina 26 secured by bar 43 which may be fastened by rivets, screws or other fastening means to the seat body. The adjacent edges of the cushion portions 22a and 22b may be separated for a distance of several inches, if desired, to provide an open channel through which cooling air may pass when an occupant is seated.

In one successful embodiment of the seat construction illustrated, the cushion member 21 was made of a relatively dense polyurethane foam 1½ inches thick, and cushion member 22 was made of similar material 2½ inches thick, the ribs 23 being 1½ inches high and the peaks thereof spaced 3 inches apart. The lamina 27 of the topper also was made of similar plastic foam about ½ inch in thickness. The inner or lower surface of this lamination may also be grooved to provide projections, if desired.

There is thus provided a novel light weight construction for seating equipment which has a neat and pleasing appearance and requires a minimum of space with maximum comfort for the occupants. The small space and light weight factors make this novelly constructed seat particularly adaptable for use in aircraft and automobiles because it permits greater seating capacity and provides greater head space and leg room for the occupants. Additionally, the seat comprises very minimum number of parts which are easy to fabricate and assemble at low cost and high speed with a minimum of skilled labor. Without additional parts, the seat here provided has a crash pad novelly and ideally combined with it. The novel upholstery or unitary topper for the entire construction is easily removable and replaceable when it becomes worn or damaged.

Although only a limited number of embodiments of the invention are illustrated in the accompanying drawings and described in the foregoing specification, it is to be expressly understood that the invention is not limited thereto. For example, the ribs 18 in seat 16 may extend transversely of the seat or may be replaced by a plurality of upward projections, such as pyramidal or cone-like projections, and the directions of ribs 18 of the backrest and the cooperating ribs 23 in cushion 22, as well as the relative directions thereof, may be varied as desired. The density, softness and dimensions of the plastic foam cushions may also be varied to suit individual tastes as to the feel of the cushion, and the various plastic foam elements of the cushion may be constituted by materials having different physical characteristics. Various other changes may also be made, such as in the size and arrangements of parts illustrated and in the compositions of the materials suggested, without departing from the spirit and scope of the invention as the same will now be understood by those skilled in the art.

What is claimed is:

1. A seat construction comprising a rigid frame having a seat portion and an integral back rest, said seat portion and back rest having a plurality of continuously extending V-shaped ribs, a seat cushion comprising a block of foamed material resting only on the apices of the ribs of said seat portion, and a cushion member of foamed material having the under surface thereof grooved to form projections to engage the upper surface of said seat cushion and the ribs of said back rest, and wherein said projections extend transversely of said ribs.

2. A seat construction as set forth in claim 1 including a tube member rigidly mounted at the top of said back rest, an extension of said grooved cushion member being curled about said tube whereby said projections are placed into contact with each other at the rear of said back rest and forming a solid portion of cushion for a crash pad and means for anchoring said extension at the rear of the back rest.

3. A seat construction comprising a rigid frame member having a seat portion and an integral back rest, said seat portion and back rest having a plurality of continuously extending V-shaped ribs, a seat cushion comprising a block of foamed material resting only on the apices of the ribs of said seat portion, a cushion of foamed material having its under surface grooved to form projections to engage said seat cushion and the ribs of said back rest, and wherein said projections extend generally at right angles to said ribs, cover means extending over the upper surface and sides of said grooved cushion, and means to secure the peripheral edges of said cover means to said frame whereby transverse movement of said cushion is prevented.

4. A seat construction as defined in claim 3 wherein said cushion and cover means form a continuous layer over said seat cushion and back rest and wherein said cushion and cover means are additionally secured to said frame at the juncture of said seat portion and back rest.

References Cited in the file of this patent

UNITED STATES PATENTS

| | | |
|---|---|---|
| 1,551,452 | Arias | Aug. 25, 1925 |
| 2,233,986 | Leech | Mar. 4, 1941 |
| 2,474,158 | Neely | June 21, 1949 |
| 2,527,635 | Hoffman | Oct. 31, 1950 |
| 2,722,267 | Litjengren | Nov. 1, 1955 |
| 2,744,567 | Larkin | May 8, 1956 |
| 2,892,489 | Hurley | June 30, 1959 |